US009543047B2

(12) United States Patent
Falcone et al.

(10) Patent No.: US 9,543,047 B2
(45) Date of Patent: Jan. 10, 2017

(54) SYSTEM AND METHOD FOR STORING FRESH AND IRRADIATED NUCLEAR FUEL

(75) Inventors: Maria E. Falcone, Wilmington, NC (US); Scott L. Pfeffer, Wilmington, NC (US); Elizabeth B. Umhoefer, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 935 days.

(21) Appl. No.: 13/608,448

(22) Filed: Sep. 10, 2012

(65) Prior Publication Data

US 2014/0072087 A1    Mar. 13, 2014

(51) Int. Cl.
| | | |
|---|---|---|
| G21C 19/00 | (2006.01) | |
| G21C 19/08 | (2006.01) | |
| G21C 19/40 | (2006.01) | |
| G21F 7/015 | (2006.01) | |
| G21F 9/00 | (2006.01) | |

(52) U.S. Cl.
CPC .............. *G21C 19/08* (2013.01); *G21C 19/40* (2013.01); *G21F 7/015* (2013.01); *G21F 9/001* (2013.01)

(58) Field of Classification Search
CPC .......... G21F 5/002; G21F 5/005; G21F 5/008; G21F 5/012; G21F 5/10
USPC ................................. 376/260, 272
See application file for complete search history.

(56) References Cited

U.S. PATENT DOCUMENTS

| | | | | |
|---|---|---|---|---|
| 2,924,483 | A * | 2/1960 | Koch ................... | G21C 19/105 294/116 |
| 3,732,427 | A * | 5/1973 | Trudeau .................... | G21F 5/14 250/505.1 |
| 4,474,727 | A | 10/1984 | Kmonk et al. | |
| 4,756,869 | A * | 7/1988 | Mallener ................ | G21C 19/40 376/261 |
| 4,780,269 | A | 10/1988 | Fisher et al. | |
| 4,800,062 | A * | 1/1989 | Craig ...................... | G21F 5/005 376/272 |
| 4,834,916 | A | 5/1989 | Chaudon et al. | |
| 6,393,086 | B1 | 5/2002 | Iacovino, Jr. et al. | |
| 2008/0236616 | A1* | 10/2008 | Bloch ................... | F22B 37/486 134/2 |

FOREIGN PATENT DOCUMENTS

FR    2803427 A1    7/2001

OTHER PUBLICATIONS

PCT Search Report issued in connection with corresponding WO Patent Application No. PCT/US2013/053767 dated on Nov. 28, 2013.

* cited by examiner

*Primary Examiner* — Marshall O'Connor
(74) *Attorney, Agent, or Firm* — Harness, Dickey, & Pierce, P.L.C.

(57) ABSTRACT

A method for storing nuclear fuel includes transferring a fuel assembly from a long term storage vault to a nuclear reactor core, removing the fuel assembly from the nuclear reactor core, determining a heat generation rate of the irradiated fuel assembly, and transferring the irradiated fuel assembly to one of an interim storage vault and a long term storage vault based on the determined heat generation rate.

11 Claims, 4 Drawing Sheets

SYSTEM AND METHOD FOR STORING FRESH AND IRRADIATED NUCLEAR FUEL

BACKGROUND

Field

Some example embodiments relate generally to a system and method for storing fresh and irradiated nuclear fuel, and more particularly to a system and method of storing fuel assemblies such that the fuel assemblies can be placed back into the reactor at a later time.

Related Art

There are several air-cooled spent fuel storage facility designs available in the nuclear industry, which are based on spent fuel elements that have been allowed to decay for several years. One of the ongoing problems at nuclear reactors is to store the spent fuel that is taken from the reactor. The fuel may be initially placed into a spent-fuel pool where the water in the pool acts as a radiation barrier for the fuel elements at the bottom of the pool. At some point, however, the fuel must be moved from the pool to permanent disposal in a repository, since, eventually, the pool will become filled with spent fuel.

It may be several years between the time that the fuel is placed in the pool and the time that it is capable of being transferred for disposal, either because it has not yet lost a sufficient amount of radioactivity to be considered safe and economical for transport, or because there is no permanent disposal facility available. Also, once the fuel is taken out of the reactor and stored, it is not reloaded into the reactor.

SUMMARY

Some example embodiments provide a system and method of storing fuel assemblies such that operators can store spent fuel straight out of the nuclear core. Other example embodiments provide a system and method of storing fuel assemblies that can be placed back into the reactor at a later time.

An example embodiment of a method for storing fuel includes transferring a fuel assembly from a long term storage vault to a nuclear reactor core, removing the fuel assembly from the nuclear reactor core, determining a heat generation rate of the irradiated fuel assembly, and transferring the irradiated fuel assembly to one of an interim storage vault and a long term storage vault based on the determined heat generation rate.

An example embodiment of a system for storing fuel includes a long term storage vault configured to store a first fuel assembly, and an interim storage vault configured to store a second fuel assembly. The first fuel assembly has a lower heat generation rate, and the second fuel assembly has a higher heat generation rate. Each of the interim storage vault and the long term storage vault contains a plurality of thimbles, and each one of the plurality of thimbles is configured to contain a single fuel assembly of the respective first and second fuel assemblies.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
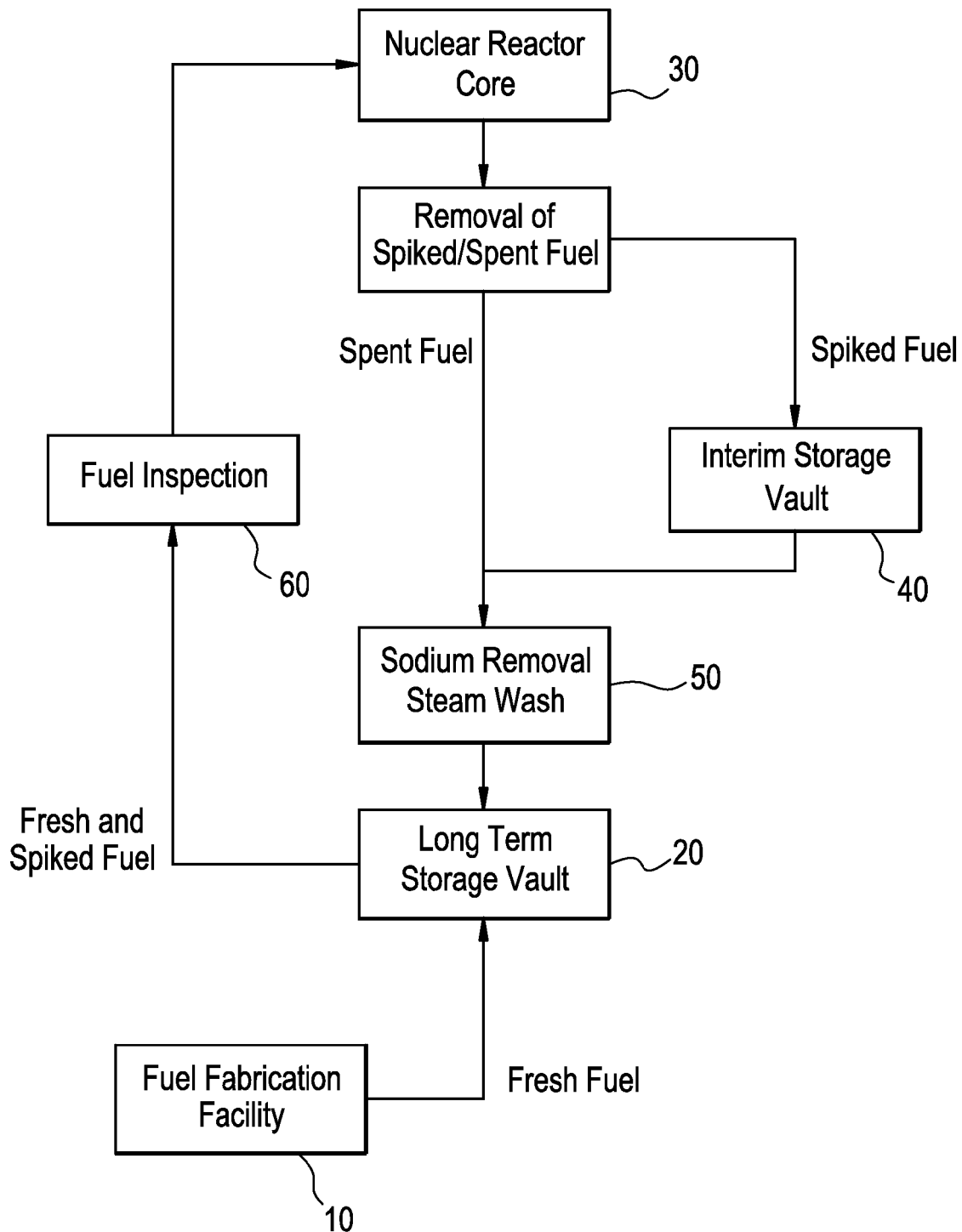
FIG. 1 is a flow diagram of a method for storing fuel assemblies, in accordance with an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are directed to a process for storing fresh (e.g., unirradiated), spiked (e.g., partially irradiated), and spent (e.g., irradiated) nuclear fuel assemblies. The method according to some example embodiments allows for storage of light water reactor and liquid metal reactor fuel in a predominantly passive manner. The method according to other example embodiments allows for the reuse or re-insertion of fuel assemblies to achieve higher burnups or to increase self-protection of the fuel if used for special nuclear material disposition.

FIG. 1 is a diagram of a system for storing fuel assemblies, in accordance with an example embodiment. The system includes at least a fuel fabrication facility 10, a long term storage vault 20, a nuclear reactor core 30, an interim storage vault 40, and a fuel inspection area 60. If the nuclear reactor core 30 is sodium cooled, the system will in addition include a sodium removal steam wash 50.

Fresh fuel is transferred from a fuel fabrication facility 10 to a long term storage vault 20. The fuel may remain in the long term storage vault 20 until it is needed for use in a nuclear reactor core 30. Before being transferred to the nuclear reactor core 30, fuel assemblies are also inspected in a fuel inspection area 60 to ensure mechanical integrity and, if needed, to determine reactivity and/or a radioactive signature in order to establish acceptability for use in the nuclear reactor core. The long term storage vault will be described in greater detail with reference to FIG. 2.

Figure 2:
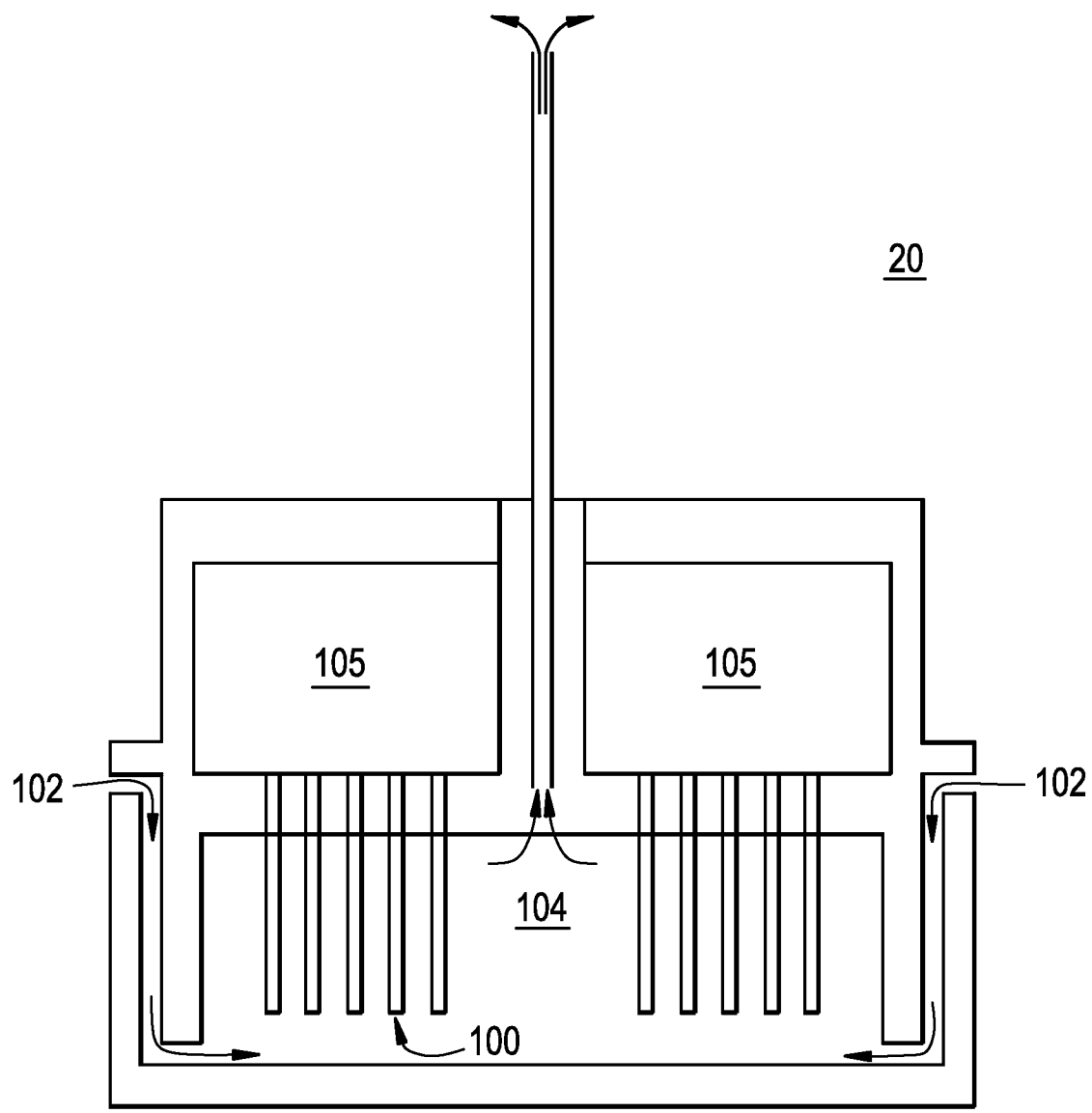
FIG. 2 is a cross-sectional view of a long term storage vault for storing fuel assemblies, in accordance with another example embodiment.

FIG. 2 is a cross-sectional view of a long term storage vault for storing fuel assemblies, in accordance with another example embodiment.

The long term storage vault 20 provides a passive air vault containing rows of thimbles 100, inlets 102, a fuel assembly handling area 105 and an outlet 104.

Each fuel assembly (see FIG. 4) is placed into an individual thimble 100 within a fuel assembly handling area 105. The temperature of each thimble 100 will be monitored to determine if given (or alternatively, predetermined) assembly-specific material limits have been exceeded.

If the temperature has exceeded a given (or alternatively, predetermined) temperature limit, the integrity of the fuel assemblies may have been compromised and should be inspected for possible damage. The thimbles 100 represent a pressure boundary and can be filled with various inert gases to improve heat transfer while maintaining reduced assembly corrosion and chemical interaction.

The long term storage vault 20 is passively cooled by allowing air to flow in through inlets 102, surround and flow across an outer wall of the thimbles 100, and be released to the external environment by the outlet 104.

Accordingly, the long term storage vault 20 is capable of storing the fuel assemblies for up to one-hundred (100) years while maintaining fuel temperatures within the permissible limits. The fuel assemblies may be stored in the long term storage vault 20 for a period of time until the fuel assemblies can be moved to an off-site location.

Referring back to FIG. 1, fuel that has been spiked (e.g., irradiated for a fraction of its expected life span) in the nuclear reactor core 30 has a heat generation rate that the long term storage vault 20 cannot support. The heat generation rate of each fuel assembly can be determined from the initial composition, time spent in the reactor, and time allowed to decay. Alternatively, direct measurements of the heat output of each fuel assembly can be made at the time of removal from the nuclear reactor core 30. Accordingly, the spiked fuel assemblies are transported to an interim storage vault 40 for short term storage. The interim storage vault 40 is capable of handling assemblies with three times more heat generation than the assemblies that can be accepted by the long term storage vault 20. The interim storage vault 40 houses the spiked fuel assemblies until the heat rate has decayed to a level that can be handled by the long term storage vault 20.

At that time, if the nuclear reactor core 30 is sodium cooled, the spiked fuel assemblies will undergo a sodium removal steam wash 50 before being transferred to the long term storage vault 20.

The spiked fuel assemblies are stored in the long term storage vault 20 until needed for use in the nuclear reactor core 30. The interim storage vault 40 will be described with greater detail in reference to FIG. 3.

Figure 3:
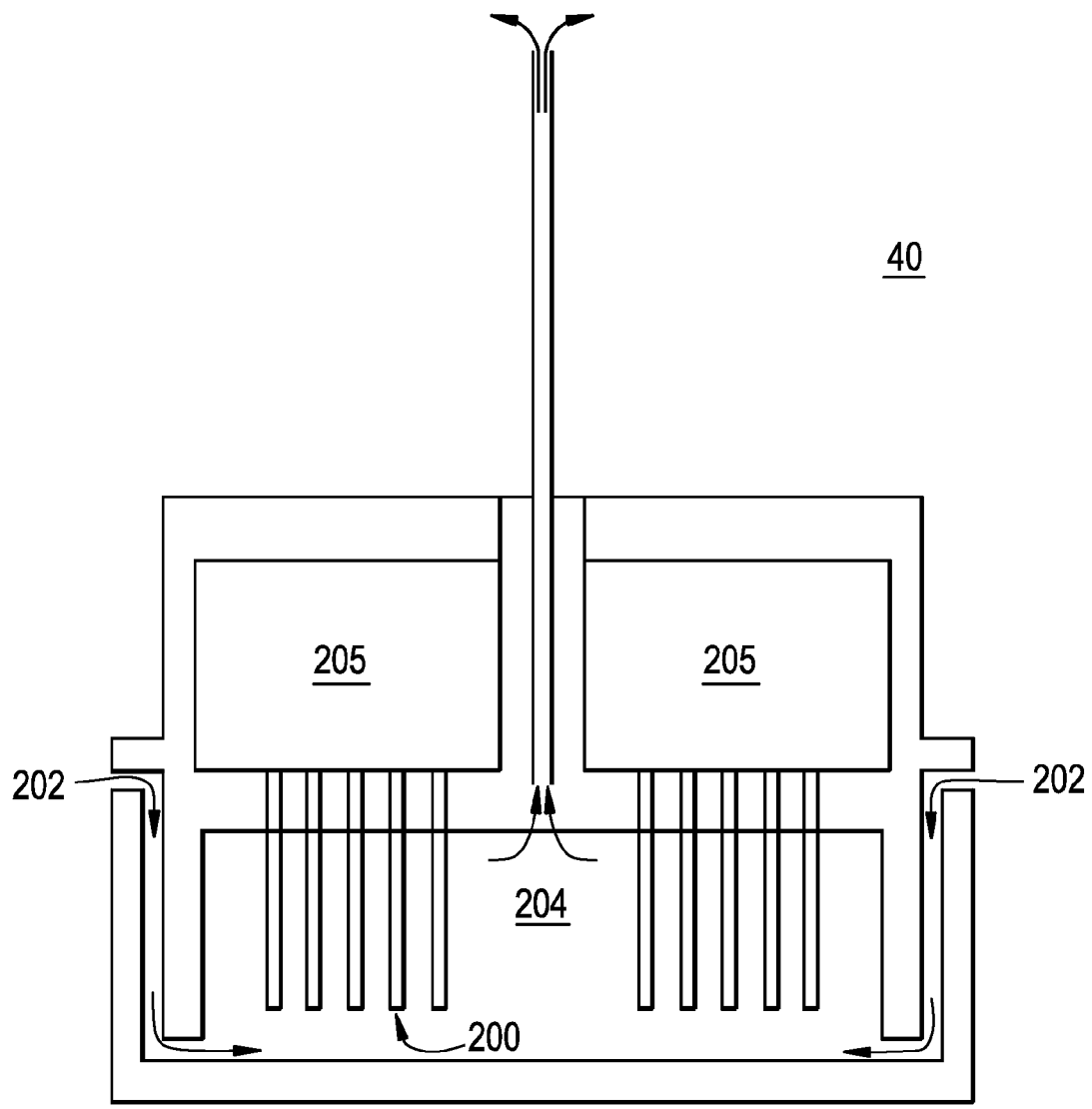
FIG. 3 is a cross-sectional view of an interim storage vault for storing fuel assemblies, in accordance with another example embodiment.

FIG. 3 is a cross-sectional view of an interim storage vault for storing fuel assemblies, in accordance with another example embodiment.

The interim storage vault 40 provides an actively air cooled vault containing rows of thimbles 200, inlets 202, a fuel assembly handling area 205 and an outlet 204. Each fuel assembly (see FIG. 4) is placed into an individual thimble 200 within the fuel assembly handling area 205. The temperature of each thimble 200 will be monitored to determine if given (or alternatively, predetermined) assembly-specific material limits have been exceeded.

If the temperature has exceeded a given (or alternatively, predetermined) temperature limit, the integrity of the fuel assemblies may have been compromised and should be inspected for possible damage.

The interim storage vault 40 is actively cooled by a ventilation system (e.g., fans, blowers, etc.). The interim storage vault 40 is actively cooled by allowing air to flow in through inlets 202, surround and flow across an outer wall of the thimbles 200, and be released to the external environment by the outlet 204.

The thimbles 200 contain a coolant material (e.g., liquid metal, inert gas, high conductivity shot, etc. for improving heat transfer). If the liquid coolant is flammable, the interim storage vault 40 is designed to contain a protective or fire retarding material (not shown) below the thimbles 200 based on the coolant material within the thimbles 200 in order to effectively negate the fire or reaction with air and a fire suppression system (not shown) located on the ground of the interim storage vault 40.

The interim storage vault 40 houses spiked fuel after it is removed from the nuclear reactor core 30 until the heat rate has decayed to a level that can be handled by the long term storage vault 20.

At that time, if the nuclear reactor core 30 is sodium cooled, the spiked fuel assemblies undergo a sodium removal steam wash 50 and are transferred to the long term storage vault 20.

The spiked fuel assemblies are stored in the long term storage vault 20 until they are needed for use in the nuclear reactor core 30. Before being returned to the nuclear reactor core 30, the spiked fuel assemblies are inspected in the fuel inspection area 60 for contamination and mechanical integrity.

Spent fuel has a heat generation rate that can be immediately handled by the long term storage vault 20. Upon removal from a sodium cooled nuclear reactor core 30, the spent fuel assemblies undergo the sodium removal steam wash 50 and then are transported to the long term storage vault 20.

Figure 4:
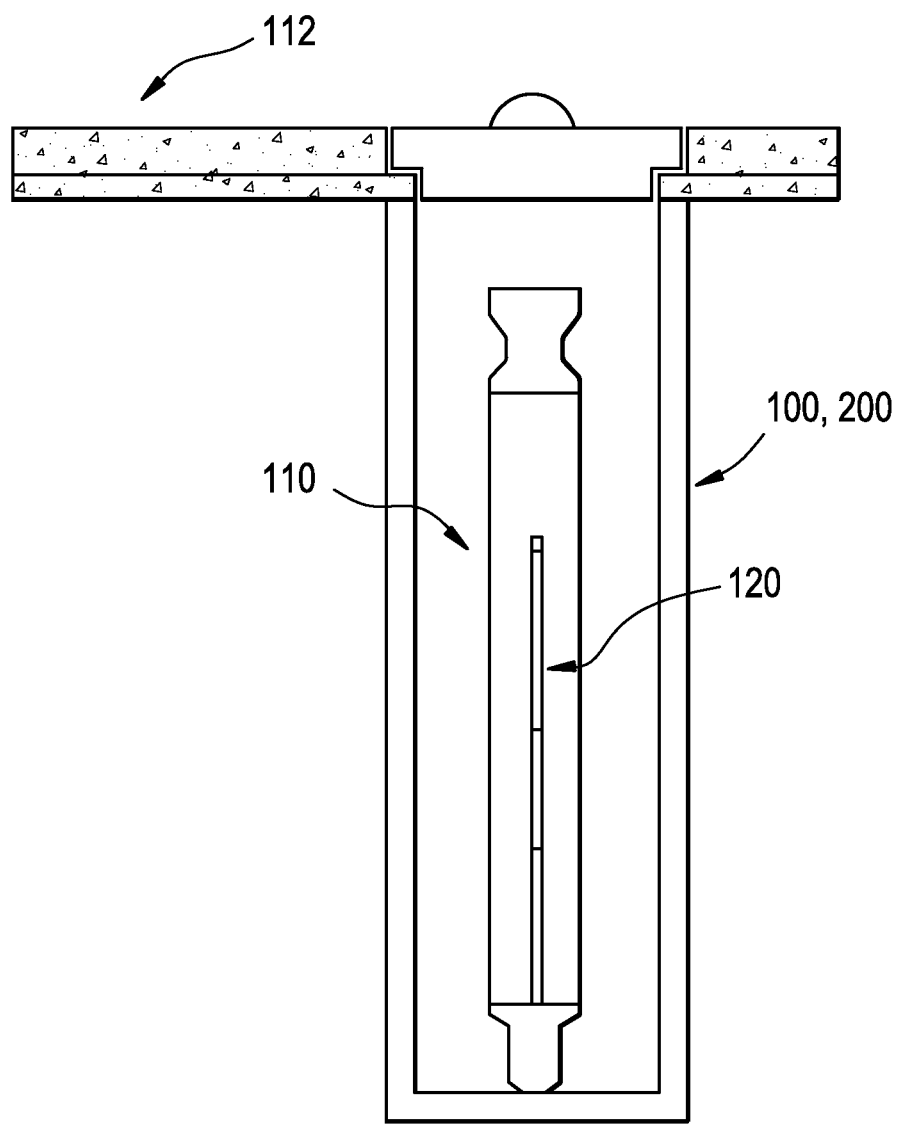
FIG. 4 is a cross-sectional view of a thimble as illustrated in FIGS. 2-3, in accordance with another example embodiment.

FIG. 4 is a cross-sectional view of a thimble as illustrated in FIGS. 2-3, in accordance with another example embodiment.

A single fuel assembly 110 is placed within the thimble 100, 200, which is a slot connected to the concrete slab 112 of the fuel assembly handling area 105, 205 (see FIGS. 2 and 3). At least one pin 120 is included in the fuel assembly 110. The pin 120 includes nuclear fuel and/or by-products of nuclear fuel after irradiation in the nuclear reactor core 30.

The storage method of an example embodiment utilizing individual fuel assemblies contained within corresponding thimbles increases the likelihood that the fuel assemblies will be free from contamination and can be reinserted into the nuclear reactor core at a later time without affecting other fuel assemblies.

Furthermore, according to an example embodiment, the method of separating fuel with higher heat generation rates (e.g., spiked fuel assemblies) and fuel assemblies with lower generation rates (e.g., fresh and spent fuel assemblies) ensures the passive safety of the majority of fuel bundles, because backup power, in the event of a station blackout, may be concentrated on the higher heat fuel assemblies while the lower heat assemblies within the passively cooled long-term storage vault will be relatively safe without any additional required actions.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method for storing nuclear fuel, the method comprising:
providing a system including an interim storage vault and a long term storage vault to a nuclear reactor site;
transferring a fuel assembly from the long term storage vault to a nuclear reactor core to irradiate the fuel assembly;
removing the irradiated fuel assembly from the nuclear reactor core;
determining a heat generation rate of the irradiated fuel assembly;
transferring the irradiated fuel assembly to one of the interim storage vault and the long term storage vault based on the determined heat generation rate; and
transferring the irradiated fuel assembly from the long term storage vault to the nuclear core.

2. The method of claim 1, wherein
the transferring the irradiated fuel assembly transfers the irradiated fuel assembly having a lower heat generation rate to the long term storage vault; and
the transferring the irradiated fuel assembly transfers the irradiated fuel assembly having a higher heat generation rate to the interim storage vault.

3. The method of claim 2, wherein the transferring the irradiated fuel assembly having the higher heat generation rate includes transferring the irradiated fuel assembly from the interim storage vault to the long term storage vault after a given period of time.

4. The method of claim 3, further comprising:
steam washing the irradiated fuel assembly to remove sodium prior to the transferring the irradiated fuel assembly to the long term storage vault.

5. The method of claim 1, wherein the nuclear reactor core is a sodium cooled nuclear reactor core, further comprising:
steam washing the irradiated fuel assembly to remove sodium prior to the transferring the irradiated fuel assembly to the long term storage vault.

6. The method of claim 1, further comprising:
inspecting the fuel assembly for contamination prior to the transferring a fuel assembly.

7. The method of claim 1, wherein the transferring the irradiated fuel assembly includes transferring a plurality of irradiated fuel assemblies to corresponding thimbles contained within one of the interim storage vault and the long term storage vault, each of the thimbles including a single fuel assembly of the plurality of irradiated fuel assemblies.

8. The method of claim 2, wherein the transferring the irradiated fuel assembly having the higher heat generation rate includes transferring a spiked fuel assembly to the interim storage vault.

9. The method of claim 2, wherein the transferring the irradiated fuel assembly having the lower heat generation rate includes transferring a spent fuel assembly to the long term storage vault.

10. The method of claim 1, further comprising:
transferring a fresh fuel assembly to the long term storage vault from a fuel fabrication facility prior to the transferring a fuel assembly.

11. The method of claim 10, wherein the transferring a fuel assembly transfers the fresh fuel assembly and the irradiated fuel assembly to the nuclear reactor core.

* * * * *